United States Patent
Gao et al.

(10) Patent No.: US 8,838,642 B2
(45) Date of Patent: Sep. 16, 2014

(54) GENERATING AND NAVIGATING BINARY XML DATA

(75) Inventors: Xiao Ming Gao, Beijing (CN); Peter F. Haggar, Raleigh, NC (US); Chang Sheng Liu, Beijing (CN); Robert Van Der Linden, Scotts Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 13/402,162

(22) Filed: Feb. 22, 2012

(65) Prior Publication Data

US 2012/0221604 A1 Aug. 30, 2012

(30) Foreign Application Priority Data

Feb. 25, 2011 (CN) .......................... 2011 1 0045815

(51) Int. Cl.
*G06F 17/30* (2006.01)
(52) U.S. Cl.
USPC ............ 707/769; 707/795; 707/796; 707/804
(58) Field of Classification Search
USPC ......................................... 707/804, 795, 796
See application file for complete search history.

(56) References Cited

U.S. PATENT DOCUMENTS

| | | | |
|---|---|---|---|
| 7,260,580 B2 | 8/2007 | Gauweiler et al. | |
| 7,321,900 B1* | 1/2008 | Karun et al. ........................... | 1/1 |
| 7,761,459 B1* | 7/2010 | Zhang et al. ................... | 707/755 |
| 7,810,024 B1* | 10/2010 | Goldman ....................... | 715/234 |
| 2002/0118214 A1* | 8/2002 | Card et al. ..................... | 345/619 |
| 2004/0143791 A1* | 7/2004 | Ito et al. .......................... | 715/513 |
| 2005/0182778 A1* | 8/2005 | Heuer et al. ................... | 707/101 |
| 2006/0168515 A1* | 7/2006 | Dorsett et al. ................. | 715/513 |
| 2008/0065596 A1* | 3/2008 | Shadmon et al. ................. | 707/2 |
| 2008/0098020 A1* | 4/2008 | Gupta et al. ................... | 707/101 |
| 2008/0120608 A1* | 5/2008 | Shetty et al. ................... | 717/144 |
| 2009/0112890 A1* | 4/2009 | Medi et al. ..................... | 707/100 |
| 2009/0150412 A1 | 6/2009 | Idicula et al. | |
| 2009/0307244 A1* | 12/2009 | Balegar et al. ................ | 707/101 |
| 2011/0179085 A1* | 7/2011 | Hammerschmidt et al. .. | 707/797 |
| 2011/0208703 A1* | 8/2011 | Fisher et al. ................... | 707/692 |

FOREIGN PATENT DOCUMENTS

EP 1439462 A2 * 7/2004 ................ G06F 9/44

OTHER PUBLICATIONS

Bayardo et al., An Evaluation of Binary XML Encoding Optimizations for Fast Stream Based XML Processing, 2004, pp. 1-10.*
IBM.com, [online]; [retrieved on Feb. 22, 2012]; retrieved from the Internet http://www-01.ibm.com/support/docview.wss?uid=swg27019354 IBM Corporation, "Extensible Dynamic Binary XML, Client/Server Binary XML Format (XDBX)," Version 1.0, Jul. 2010; pp. 1-41.

* cited by examiner

Primary Examiner — Albert Phillips, III
(74) Attorney, Agent, or Firm — Cantor Colburn LLP; Terry Carroll (57) ABSTRACT

According to exemplary embodiments, a method and system for generating binary Extensible Markup Language (XML) data is provided. The generating includes acquiring an XML data source and generating a first child distance (FCD) token and a next sibling distance (NSD) token of an element node in the XML data source. The generating also includes generating binary XML data of the XML data source by using the FCD token and the NSD token, where the binary XML data includes the FCD token and the NSD token.

20 Claims, 9 Drawing Sheets

↓1　↓2　　　　　↓3　　↓4　5↓↓6
X3dep1Y3mgr25peterX4proj3T3WebzX3emp4T4JohnzzZ

FIG. 4A

↓1　　2⌒⌒⌒⌒⌒⌒⌒⌒⌒⌒⌒⌒→　　　　　3⌒⌒⌒⌒→
X3dep1v0018>0000Y3mgr25peterX4proj3v0000>0007T3WebzX3emp4v000
0>0008T4JohnzzZ

85 05 03 P e t e r 00 01 66 03 W e b 00 01 67 03 J o h n 00 01 01
dep mgr          string end  proj        proj end          emp end   dep end
                 attribute end            emp

```
     name def         qname def          element dep                              attribute mgr
     ─────────        ─────────          ───────────                              ─────────────
     F0 03 d e p  EF 00 00 01 F8 01  F0 03 m g r  EF 00 00 02 F6 02 11
             attribute end                              element proj         proj end
             ────────────                              ────────────          ────────
     05 P e t e r F5  F0 04 p r o j  EF 00 00 03 F8 03 11 03 W e b F7
                                      element emp       emp end  dep end
                                      ───────────       ───────  ───────
     F0 03 e m p  EF 00 00 04 F8 04 11 04 J o h n F7 F7
```

GENERATING AND NAVIGATING BINARY XML DATA

PRIORITY

This application claims priority to Chinese Patent Application No. 201110045815.8 filed 25 Feb. 2011, and all the benefits accruing therefrom under 35 U.S.C. §119, the contents of which in its entirety are herein incorporated by reference.

BACKGROUND

The present invention relates to the Extensible Markup Language (XML) data processing technical field, and more specifically, to a technique for improving generation and query of binary XML data.

XML is a data description language with a powerful data describing capability and a self-description feature, so that an XML data source is readable by both humans and machines. The features of XML techniques and standardization of related techniques make XML widely used in fields such as web or internet applications. XML is a general format for data exchange between different systems and automated systems with XML as an interface. However, XML techniques may be very complex, causing a considerable workload to be introduced to the system by processing XML. Further, network overhead between the systems is also increased by the redundancy of XML data. When XML is used as a data transmission format, XML compression techniques may be viable options for reducing data redundancy in order to improve bandwidth utilization, but may further increase the operating load of a local machine. An alternative in a resource-limited computing system is to use binary XML.

Binary XML is a compact binary expression form of XML data, and thus notably reduces redundancy of the XML data, such that parsing of XML data becomes easier, the operating load of system for processing XML data is alleviated, and bandwidth occupied by XML data transmission is reduced. Binary XML was initially proposed and used in the wireless application field, and may have different specifications, such as: WBXML (wireless application protocol binary XML), Fast Infoset (X.891) and EXI (Efficient XML Interchange). Along with its use in systems with limited resources, many systems requiring high performance (e.g., databases) also use binary XML to transmit the XML data and to perform XML data processing.

Although binary XML may reduce redundancy of the XML data, its use may result in an increase in processing time. When processing a query request for binary XML to navigate to a node (or an element) therein, each of the nodes (including element nodes and non-element nodes) in the binary XML data source needs to be traversed one by one. This may greatly reduce the efficiency of navigating to the node and may prolong the time for a corresponding query request when the XML data source has a large number of nodes and a complex tree relation.

BRIEF SUMMARY

According to exemplary embodiments, a method and system for generating binary Extensible Markup Language (XML) data is provided. The generating includes acquiring an XML data source, and generating a first child distance (FCD) token and a next sibling distance (NSD) token of an element node in the XML data source. The generating also includes generating binary XML data of the XML data source by using the FCD token and the NSD token. The binary XML data includes the FCD token and the NSD token.

According to other exemplary embodiments, a method and system for navigating to a node in binary XML data that includes a token and a NSD token is provided. The navigating includes receiving a request to query a node in the binary XML data and acquiring a query path of the request. The navigating also includes navigating to the node using the query path, the FCD token and the NSD token.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The above and other features of the present invention will be more apparent by describing in detail the embodiments shown in combination with the accompanying drawings, wherein like reference signs represent identical or similar parts, and wherein.

DETAILED DESCRIPTION

Embodiments of the present invention are directed to methods and systems for generating binary Extensible Markup Language (XML) data and for navigating to nodes in the generated binary XML data.

Figure 1:
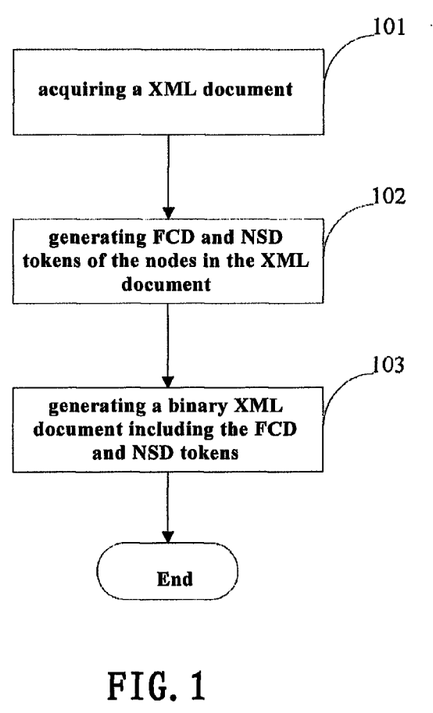
FIG. 1 is a flow chart showing a method for generating binary Extensible Markup Language (XML) data according to an embodiment of the present invention.

FIG. 1 is a flow chart showing a method for generating binary XML data according to an embodiment of the present invention.

The method shown in FIG. 1 starts at block 101. At block 101, an XML data source is acquired. Here, the acquired "XML data source" refers to an XML data source that has not been subjected to a compaction process and exists in a tree structure. The XML data source can be information existing in any form and expressing XML semantics, including but not limited to: an XML document, an XML information stream, a simple application programming interface for XML (SAX) event stream, and a hierarchical or tree storage structure.

The "tree structure" is an important feature of the XML data resource, and it means that the XML data source represents hierarchical relationships between multiple element nodes having a hierarchy structure, where the top element node is called a "root node", and the bottom element node is called a "leaf node". A "root node" has no parent node and no sibling node, but may have "child node". A "leaf node" has no child node, but may have "parent node" or "sibling node". A relationship between a node and its "parent node" or "child node" is similar to a relationship between a superior and its subordinate, and a node and its "sibling node" are at the same level. It should be noted that, an "element node" differs from a "node" in meaning. "Node" as used herein may include various nodes such as an element node, a text node and an attribute node, whereas an "element node" specially refers to a node composed of elements in an XML data source. In addition, the terms "root node", "parent node", "child node", "sibling node" or "leaf node" are used herein are short for "root element node", "parent element node", "child element node", "sibling element node" and "leaf element node", respectively.

Next, the method of FIG. 1 advances to block 102. At block 102, with respect to an element node in the XML data source, a FCD (first child distance) token and a NSD (next sibling distance) token of the element node are generated. According to an embodiment of the present invention, the FCD token of the element node represents a distance from an end point of the FCD token to a start point of the first child node of the element node. If the element node is a leaf node, the FCD token is zero and the NSD token of the element node represents a distance from an end point of the NSD token to a start point of a next sibling node of the element node. Such definitions are based on the fact that XML is essentially an expression of a tree relation, so element b can be nested in element a, and element b certainly has ended when element a ends, that is, an end navigation of element a (outer element, or parent element) is certainly behind an end navigation of element b (inner element, or child element). According to another embodiment of the present invention, if the element has no sibling node, the NSD token of the element node represents a distance from the end point of the NSD token to the end point of the parent node of the element node. In this case, if the element node has neither a next sibling node nor a parent node, the NSD token of the element node is zero. It should be noted that many ways can be adopted to define the FCD and NSD tokens, for example, the NSD of an element node is zero if the element node has no next sibling node. For example, the value of the FCD token may be an offset with respect to start navigation of the first child node of the node, and FCD is zero if the node is a leaf node. The value of the NSD token may be an offset with respect to start navigation of the next sibling node of the node, and NSD is zero if the node has no next sibling node. Generally, the FCD and NSD can be defined in any way, as long as information of a distance between a node and its first child node or between a node and its next sibling node can be obtained directly or calculated indirectly, which all fall into the protection scopes of the present invention. As for a specific process of calculating the FCD and NSD, it may be different according to the different binary XML format to be generated, as will be described in detail below in combination with FIG. 2.

Next, at block 103, binary XML data of the XML data source are generated by using the FCD token and the NSD token, the binary XML data including the FCD token and the NSD token. A same source XML data source can generate different binary XML data sources based on different formats of binary XML data sources to be generated. However, no matter what format or standard of binary XML is used, no FCD token or NSD token are included in the binary XML data source generated. At block 103, the FCD and NSD tokens are added to the nodes in the binary XML in the process of converting source XML to binary XML. Therefore, the binary XML generated by the method shown in FIG. 1 includes the FCD token and the NSD token. According to an embodiment of the present invention, the FCD token and the NSD token of each node in the binary XML are included behind the node, and the arranging order of the FCD token and the NSD token of each node can be arbitrary. According to an embodiment of the present invention, the FCD token and the NSD token have a fixed length for each element node in the binary XML, that is to say, no matter what value the FCD and the NSD have, for each element node, these two tokens both occupy certain character length. According to another embodiment of the present invention, the FCD token and the NSD token are length-variable; that is to say, specific values of the FCD token and the NSD token will affect byte length occupied by the FCD token and the NSD token of an element node. Because the FCD and NSD tokens are included in binary XML, a number of nodes can be skipped over by using the included FCD token and NSD token when querying or navigating to node in the binary XML, without the need of scanning the nodes in the binary XML one by one, thereby improving the efficiency of navigating to the node. A specific example in which the FCD token and the NSD token are included will be described in detail below. It should be further emphasized that, in the above illustrative definitions of FCD and NSD, an "end point" in a FCD token of the node represents a distance from an end point of the node to a start point of its first child node and is no longer simply an original end navigation of the node in the case that the FCD token and the NSD token are added, and the byte length occupied by the FCD and NSD tokens must be taken into account. The "end point" may be understood as "current navigation", and in the case that the FCD token and the NSD token are added, the "current navigation" takes the byte length occupied by the two tokens into account. Likewise, an "end point" in a NSD token of the node represents a distance from the end point of the node to a start point of its next sibling node. Specific meanings of the distances represented by the FCD and NSD will be presented in more detail below.

Figure 2:
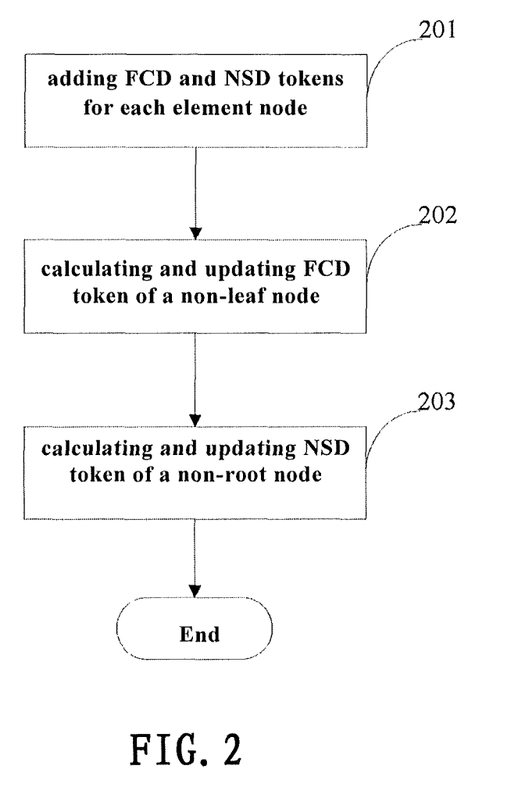
FIG. 2 is a flow chart showing a method for generating a first child distance (FCD) token and a next sibling distance (NSD) token according to an embodiment of the present invention.

FIG. 2 is a flow chart showing a method for generating a FCD token and a NSD token according to a further embodiment of the present invention. First of all, it should be noted that the method shown in FIG. 2 is performed in the process of generating binary XML data from an XML data source. Those of ordinary skill in the art should appreciate that, the nodes in the XML data source are processed sequentially in the process of generating binary XML data in the prior art.

At block 201, FCD and NSD tokens whose initial values are zero are added behind each element node of the XML data source. At block 202, in the process of processing the nodes of the XML data source sequentially, for the value of FCD of a non-leaf node, when a first child node of the non-leaf node is encountered, a distance from an end point of the non-leaf node to a start point of the first child node is calculated, thereby obtaining the value of FCD and updating the initial value of the FCD token. At block 203, in the process of processing the nodes of the XML data source sequentially, for the value of NSD of a non-root node, when a next sibling node of the non-root node is encountered, a distance from an end point of the non-root node to a start point of the sibling node is calculated, thereby obtaining the value of NSD of the non-root node and updating the initial value of the NSD token. If the NSD is defined as follows: when an element node has no next sibling node, the NSD is a distance from the element node to an end point of its parent node, then, when the end point of the parent node of the non-root node is encountered, a distance from the end point of the non-root node to the end point of the parent node can be calculated as well, thereby obtaining the value of NSD of the non-root node and updating the initial value of the NSD token. Those of ordinary skill in the art should appreciate that, the specific method for calculating the FCD and NSD may be related to the specific assignment rule for the FCD and NSD in special cases (for example, a node does not have a next sibling node, does not have a child node, or does not have a parent node), however, regardless of what assignment rule for the FCD and NSD is in special cases is, basic meanings of the FCD and NSD tokens are consistent: the FCD token represents a distance from an end point of the node to a start point of its first child node, and the NSD token represents a distance from the end point of the node to a start point of its next sibling node. Moreover, those of ordinary skill in the art could extend the algorithm to different definitions of the FCD and NSD on the basis of the principle and spirit of the algorithm described above.

The above has described a summarized algorithm for generating FCD and NSD tokens, and a more detailed operating flow, namely, a more detailed FCD/NSD calculating step, includes the following: (a) initializing an auxiliary global data structure; (b) checking an auxiliary data status at the start of processing each element node (startElement), and if FCD of its parent node is needed and can be got through calculation, then calculating FCD of the parent element according to a corresponding formula and updating FCD value of the parent element; (c) generating binary XML contents of the element node being currently processed, and updating auxiliary data information; and (d) checking an auxiliary data status at the end of processing each element node (endElement), and if NSD of the current element is needed and can be got through calculation, then calculating NSD of the current element according to a corresponding formula and updating NSD value of the current element and generating subsequent XML contents.

Next, a process which is microcosmically operable to generate FCD and NSD tokens includes the following steps based on the above-described method for generating FCD and NSD tokens: (a) initializing a stack storing integer values, and recording a start storage navigation m_nsd of NSD value of each element; (b) checking the stack at the start of each element node (startElement), and if the stack is not empty and FCD of the parent node is zero, then reading the top value m_nsd of the stack and calculating FCD of the parent node according to the formula: FCD=cursor−m_nsd+2 (where cursor is the current "cursor" at which the generated binary XML is stored), and updating FCD value of the parent node stored at the navigation (m_nsd−5); (c) popping the top value of the stack if the parent node is a root node; (d) generating binary XML contents of the current node, adding a FCD/NSD label whose initial value is zero behind an element node label unit, and putting the start navigation m_nsd of NSD value of the present element node to the top of the stack; (e) checking the stack at the end of each element node (endElement), and if the stack is not empty, then popping the top value m_nsd of the stack, and calculating NSD of the present element node according to the formula:

NSD=cursor−m_nsd−2, and updating NSD value stored at the navigation m_nsd; and (f) generating subsequent binary XML contents.

It may be determined from the above detailed process of generating FCD and NSD tokens that the definitions for FCD and NSD on which the above calculating method is based are as follows: FCD represents a distance from the current navigation to the first child node of the present element node, and if the present element node is a leaf node (i.e. without child node), FCD is zero; NSD represents a distance from the current navigation to the next sibling node of the present element node, and if there has no next sibling node, NSD represents a distance from the current navigation to the end navigation of the parent node, and if there has neither a next sibling node nor a parent node, NSD is zero. Those of ordinary skill in the art could extend the algorithm to all definitions of FCD and NSD after understanding the principle of the stack algorithm described above and only need to change the specific formula according to the specific definition.

Figure 3:
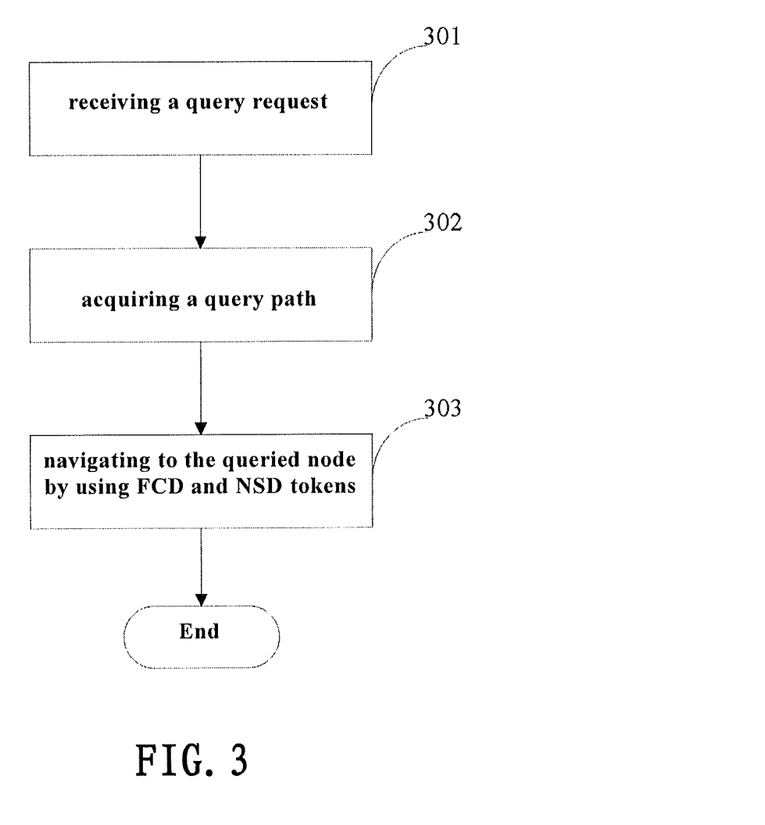
FIG. 3 is a flow chart showing a method for navigating to a node in the binary XML data according to an embodiment of the present invention.

FIG. 3 is a flow chart showing a method for navigating to a node in binary XML data according an embodiment of the present invention. A binary XML data file used by the method shown in FIG. 3 includes a FCD token and a NSD token of an element node. The binary XML data including the FCD token and the NSD token has already existed, and no matter what method is adopted to generate the binary XML data, it falls into the protection scopes of the present invention. The method shown in FIG. 3 starts at block 301. At block 301, a request to query a node in the binary XML data is received. The query request can be issued in a form of a database structured query language (SQL)/XML instruction or as a XQuery. According to an embodiment of the present invention, the binary XML data includes the FCD and NSD tokens. Exemplary meanings of FCD and NSD tokens and alternative definitions thereto have been described above.

At block 302, a query path (Xpath) of the query request is acquired. Xpath uses a path expression to select a node or a set of nodes in an XML document. Since the XML data source has a tree structure, the query path also has a tree structure. Take the following XML data source as an example:

```
<dep mgr="Peter">
    <proj>Web</proj>
    <emp>John</emp>
</dep>
```

The above XML data source includes three elements: dep (root node), proj (leaf node), and emp (leaf node), where node dep has two child nodes proj and emp, proj and emp are sibling nodes to each other, but only emp is "a next sibling node" of proj on the basis of sequencing in the XML document. The binary XML data based on an improved IBM binary XML format (i.e., including FCD and NSD tokens) of the XML data source is as follows:

X3dep1v0018>0000Y3mgr25peterX4proj3v0000>0007T3WebzX3
emp4v0000>0008T4JohnzzZ

The underlined parts are FCD and NSD tokens of each node, in particular, "v0018" is an embodiment of the FCD token, where symbol "v" labels FCD and the value following symbol "v" is an exact value of the FCD token; similarly, symbol ">" labels NSD and the value following symbol ">" is an exact value of the NSD token. Specific processes of generating the binary XML data source including the FCD and NSD tokens have been described in detail in FIG. 1 and FIG. 2 and corresponding descriptions thereof. The way of generating other parts of the binary XML data source other than the FCD and NSD tokens may be implemented by referring to currently published multiple format specifications of binary XML data source.

It can be seen that, the binary XML data source after being subjected to a compaction process still retains the tree structure of the source XML. The specific method for generating binary XML from the source XML can be described by referring to format definitions of related binary XML standards. The examples of binary XML listed here are not the binary XML to which the FCD and NSD tokens are added according to the present invention, but belong to the binary XML generated according to existing format definitions of binary XML.

In this XML data source, <dep>, <proj> and <emp> are all element nodes (also called elements), wherein <dep> is a root node and has two child nodes <proj> and <emp>, <proj> and <emp> are sibling nodes to each other. If the value of node <emp> is queried now, the query path expression is /dep/emp/.

Figure 4A:
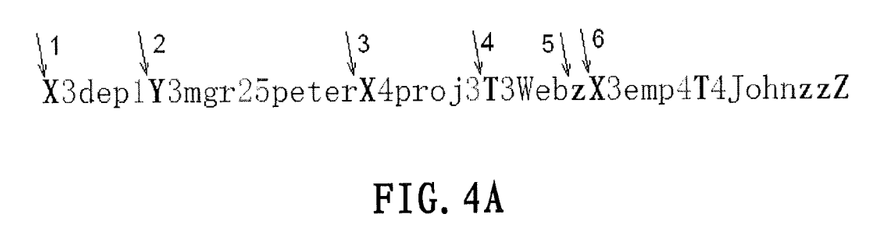
FIG. 4A is a schematic diagram showing a node query based on IBM binary XML excluding the FCD and NSD tokens according to an embodiment of the present invention.
Figure 4B:
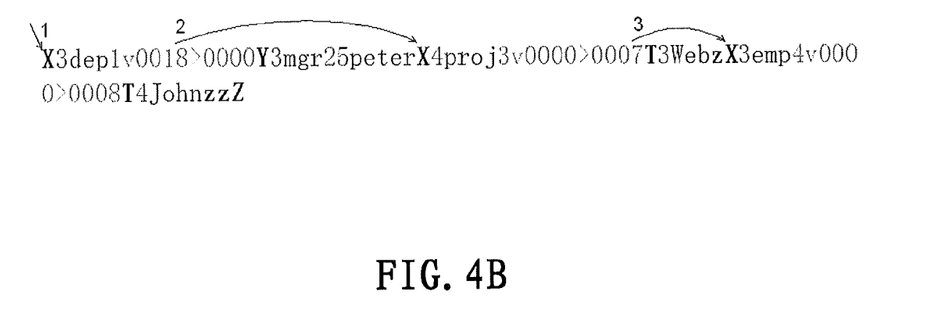
FIG. 4B is a schematic diagram showing node query based on IBM binary XML including the FCD and NSD tokens according to an embodiment of the present invention.

Next at block 303, the queried node is navigated to by using the query path and the FCD and NSD tokens. If the node query is performed with respect to a binary XML data source excluding FCD and NSD tokens, each node including element nodes (e.g., dep starting with "X"), attribute nodes (e.g., mgr starting with "Y") and text nodes (e.g., Web starting with "T") has to be scanned one by one, until the element node exp to be queried is finally scanned. However, now, if the binary XML data source includes FCD and NSD tokens of each node, then some of the nodes can be skipped over by using the FCD and NSD tokens to directly navigate to the element node exp. FIG. 4A and FIG. 4B are schematic diagrams respectively showing node query based on binary XML excluding FCD and NSD tokens and node query based on binary XML including FCD and NSD tokens. As shown in FIG. 4A, the cursor needs "skipping" six times before navigating to the element node emp to be queried. While as shown in FIG. 4B, the cursor only needs "skipping" three times before navigating to the element node emp to be queried; since the attribute nodes mgr, the element node proj and the text node peter are directly skipped over, the efficiency of navigating to the node in the binary XML data source is improved greatly.

Figure 5:
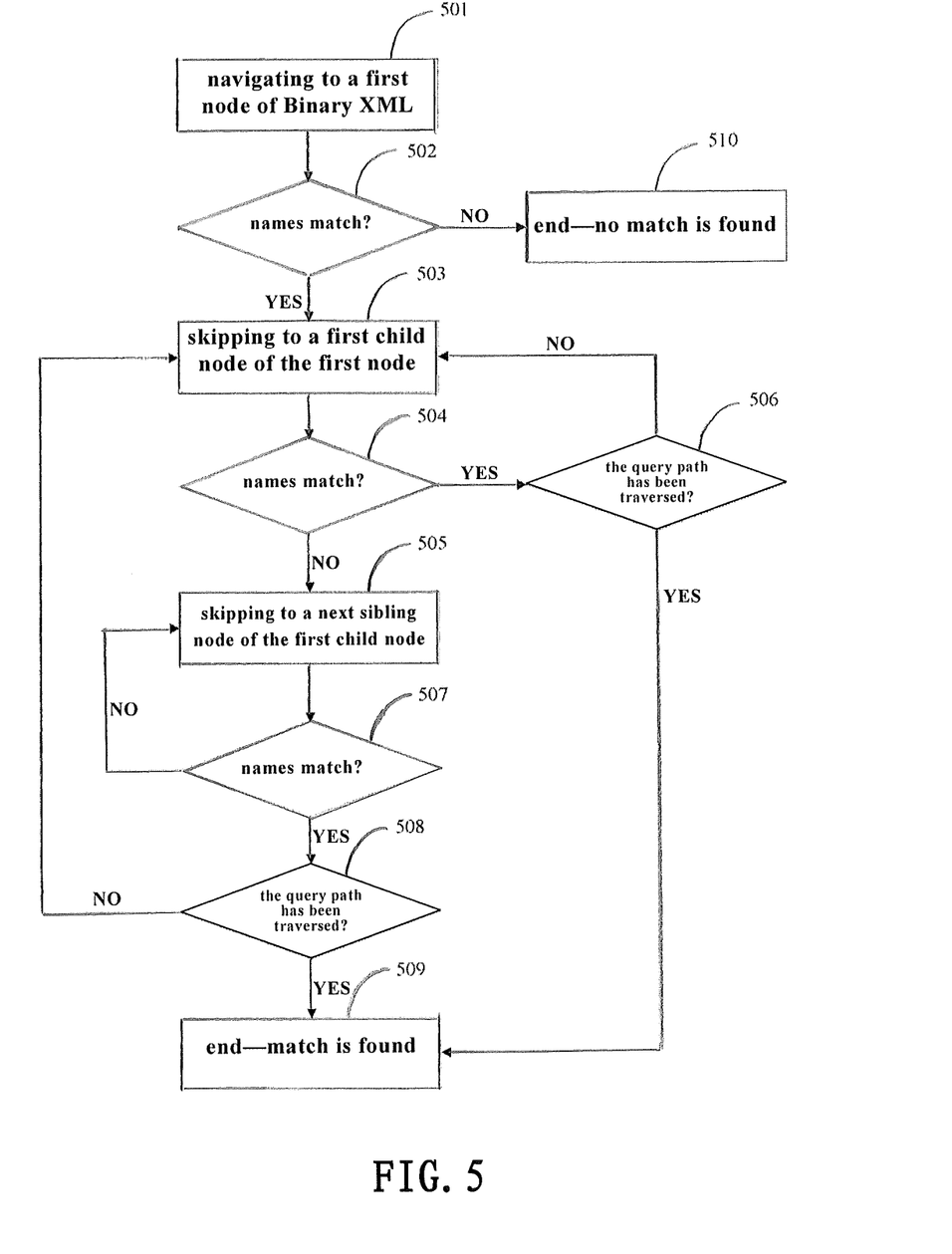
FIG. 5 is a flow chart showing a method for navigating to a node in the binary XML data according to a further embodiment of the present invention.

FIG. 5 is a flow chart showing a method of navigating to a node in binary XML data according a further embodiment of the present invention. For the convenience of description, the flow of the method of FIG. 5 is described in detail by taking a specific XML data source and corresponding binary XML data including FCD and NSD tokens as example. First of all, it should be noted that, the following illustrated binary XML data is based on an IBM binary XML standard format.

Assume that XML data source is as follows:

```
<dep mgr="Peter">
    <proj>Web</proj>
    <emp>John</emp>
</dep>
```

The binary XML data based on the IBM binary XML format (including FCD and NSD tokens) of the above XML data source is as follows:

X3dep1v0018>0000Y3mgr25peterX4proj3v0000>0007 T3WebzX3emp4v0000>0008T4Joh nzzZ

Further assume that the query request (SQL or XQuery) submitted by the user is to query contents of element node emp, then the query path Xpath is /dep/emp/ (the concrete SQL statement or XQuery statement is omitted here).

At block 501, a first node (namely, the root node) of the binary XML data is navigated to. Since binary XML is similar to XML data source, it also has a sequential tree structure, so a sequential scanning starting from the root node is made when querying the node in the binary XML data.

At block 502, it is judged whether the name of the first node (root node) of the binary XML data navigated to is consistent with that of the first element in the query path. If yes, the flow advances to block 503, and if No, the flow advances to block 510. Reasons for inconsistency include wrong inputs of the query request. At block 510, the flow ends because no match is found. In the above example, the first element in the query path /dep/emp/ is "dep", which is consistent with the name of the first node of the binary XML data, so the flow advances to block 503.

At block 503, the flow skips to the first child node of the first node according to the FCD token of the first node. In the above example, FCD and NSD tokens v0018>0000 are included behind the first node dep, wherein the FCD token is on the left of ">" and the NSD token is on the right of ">". In this example, the value of the FCD token is 0018 which represents that counting backwards 18 bytes from the last byte "8" of the FCD token, one reaches the start of the first child node proj of the node dep. Therefore, at block 503, the flow skips backwards 18 bytes according to the FCD token 0018 of the node dep, and navigates directly to the start "X" of the first child node proj of dep. The attribute node mgr is skipped over through this skip.

Next, at block 504, it is judged whether the name of the first child node of the first node is consistent with that of the second element in the query path. If Yes, the flow advances to block 506, and if No, the flow advances to block 505. In the above example, since the name of the second element in the query path /dep/emp/ is emp, which isn't consistent with the name of the first child node proj of the first node dep to which the flow skips in the block 503, the flow advances to block 505.

The operation of block 506 will be explained before describing block 505. At block 506, it is judged whether the query path has been traversed. "Being traversed" means that the last element in the query path is the node skipped to currently. If the judgment result of block 506 is Yes, this shows that the query path has been processed and a matched result has been found, and thus the flow ends at block 509. If the judgment result of block 506 is No, this shows that there are still other nodes which have not been processed in the query path, therefore the flow returns to block 503. It should be noted that the flow should skip to the first child node of the current node at block 503 when returning from block 506 to block 503, rather than "skipping to a first child node of the first node" as recited in the literal description of FIG. 5. For all the other steps of the returning loop to block 503 shown in the flow chart of FIG. 5, they are all performed with respect to "the node currently skipped to." The description in FIG. 5 is only provided for describing operations in the first processing cycle, and those of ordinary skill in the art would know this from the literal description of the present paragraph.

At the block 505, the flow skips to the next sibling node of the first child node by using the NSD token of the first child node. In the above example, the first child node is proj, and its next sibling node is emp. In the above binary XML data, the NSD token of the first child node proj is 0007, which represents that counting backwards 7 bytes from the last byte "7" of the NSD token, one reaches the start "X" of the next sibling node emp of the node proj. The text node "Web" is skipped over through this skip.

Next at block 507, it is judged whether the name of the sibling node skipped to is consistent with that of the second element in the query path (just before at the block 504, it is known that the name of the second element in the query path is not consistent with that of the first child node of the root node). According to the above example, the name emp of the second element in the query path /dep/emp/ is consistent with that of the next sibling node emp of the first child node proj to which the flow skips in the block 505, so the flow advances to block 508.

At block 508, it is judged whether the query path has been traversed. As described above, the last element emp in the query path /dep/emp is the node currently skipped to, so the query path has been traversed, and a match is found, thus the flow ends at block 509.

If the judgment result of the block 507 is No, the flow returns to block 505 to skip to the next sibling node of the current node (namely, the next sibling node of the node emp) until the judgment result of block 507 is Yes.

If the judgment result of block 508 is No, the flow returns to block 503 to skip to the first child node of the current node (namely, the first child node of the node emp).

It should be further noted that, for the sake of brevity, some steps are not shown in the flowchart of FIG. 5. For example, a step of judging whether the end of the parent node of the current node is reached can be included between the block 505 and the block 507. If it is specified at the time of defining the meaning of the NSD token that, if a node has no next sibling node, the NSD token represents a distance from the end point of the node to the end point of its parent node, then the sibling node to which the flow skips in block 505 may be in fact the end navigation of its parent node. In this case, the flow directly advances to the end block 510, that is to say, no match is found. According to the above example, the node emp has no next sibling node (emp is the next sibling node of proj, but proj isn't the next sibling node of emp, this is decided on the basis of sequentiality of XML data), then a value of the distance from the end point of the node emp to the end point of its parent node dep (</dep>) is assigned to the NSD token (i.e. 0008) of node emp. Assuming that the query path is /dep/abc/, then at block 505, the flow skips seven bytes to the end point "z" of the parent node of emp, so it can be learned through judgment that the current node is the end point of its parent node, thus the flow directly advances to block 510 to end and no match is found. Those of ordinary skill in the art should appreciate that the above judgment about whether the end point of the parent node is reached is related to the definition to the NSD token, and usage of a different definition to the NSD token may influence specific steps of navigating to nodes. Further, those of ordinary skill in the art could apply the principles and methods revealed in the above examples on the basis of the IBM binary XML standard format to multiple other definitions to the FCD and NSD tokens, and to multiple other binary XML formats such as wireless application protocol (WAP) binary XML (WBXML) and Microsoft® Server Binary XML (MS-BINXML).

In the above descriptions of FIG. 5, the characters "z", "X", etc. belong to characters having special meanings, specified in the specifications of the IBM binary XML standard format, and should not be construed as any limitations to embodiments of the present invention.

Figure 6:
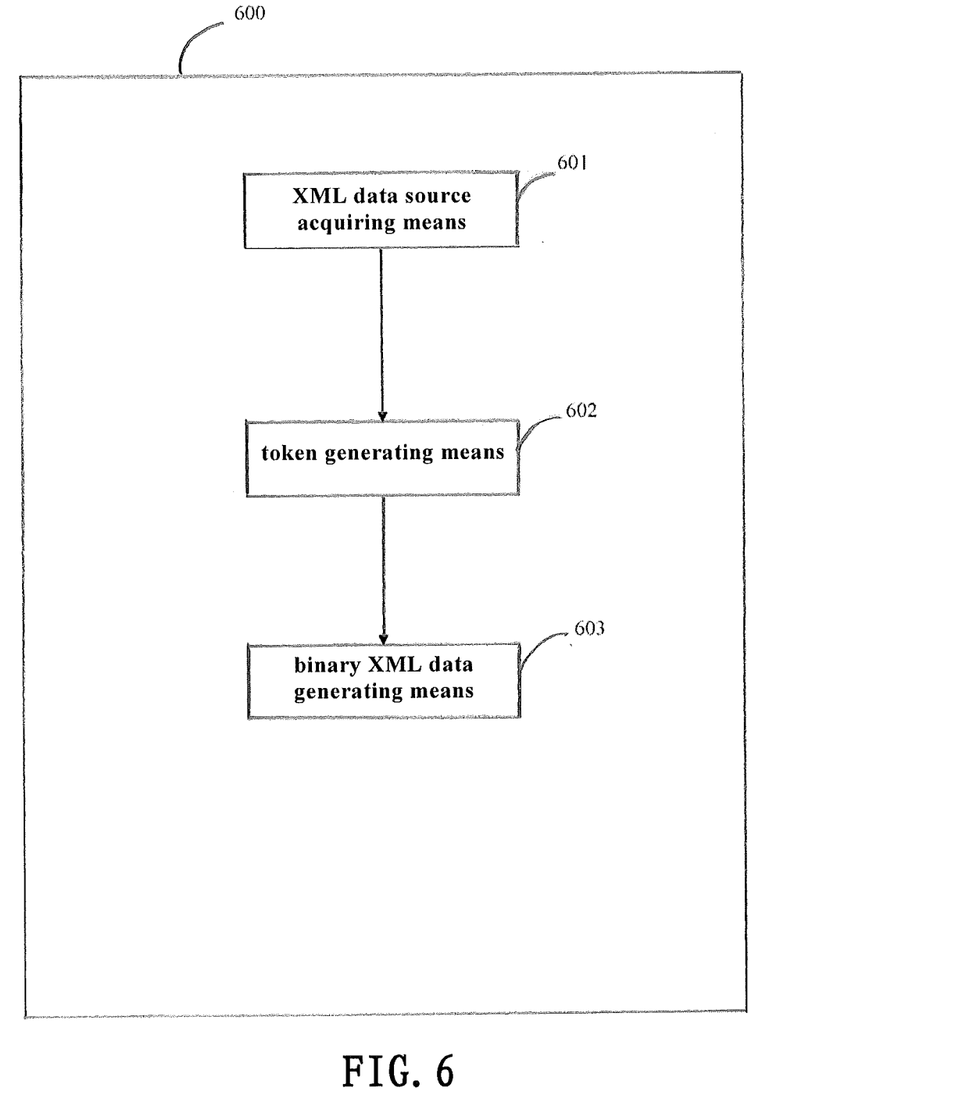
FIG. 6 is a block diagram showing a system for generating binary XML data according to an embodiment of the present invention.

FIG. 6 is a block diagram showing a system for generating binary XML data according to an embodiment of the present invention. The system shown in FIG. 6 is represented by a system 600 as a whole. Specifically, the system 600 includes an XML data source acquiring means configured to acquire an XML data source; token generating means 602 configured to, with respect to an element node in the XML data source, generate a FCD token and a NSD token of the element node; and binary XML data generating means 603 configured to generate binary XML data of the XML data source by using the FCD token and the NSD token, the binary XML data including the FCD token and the NSD token. It can be understood that, the means 601-603 in the system 600 correspond to blocks 101-103 of the method shown in FIG. 1, respectively.

Figure 7:
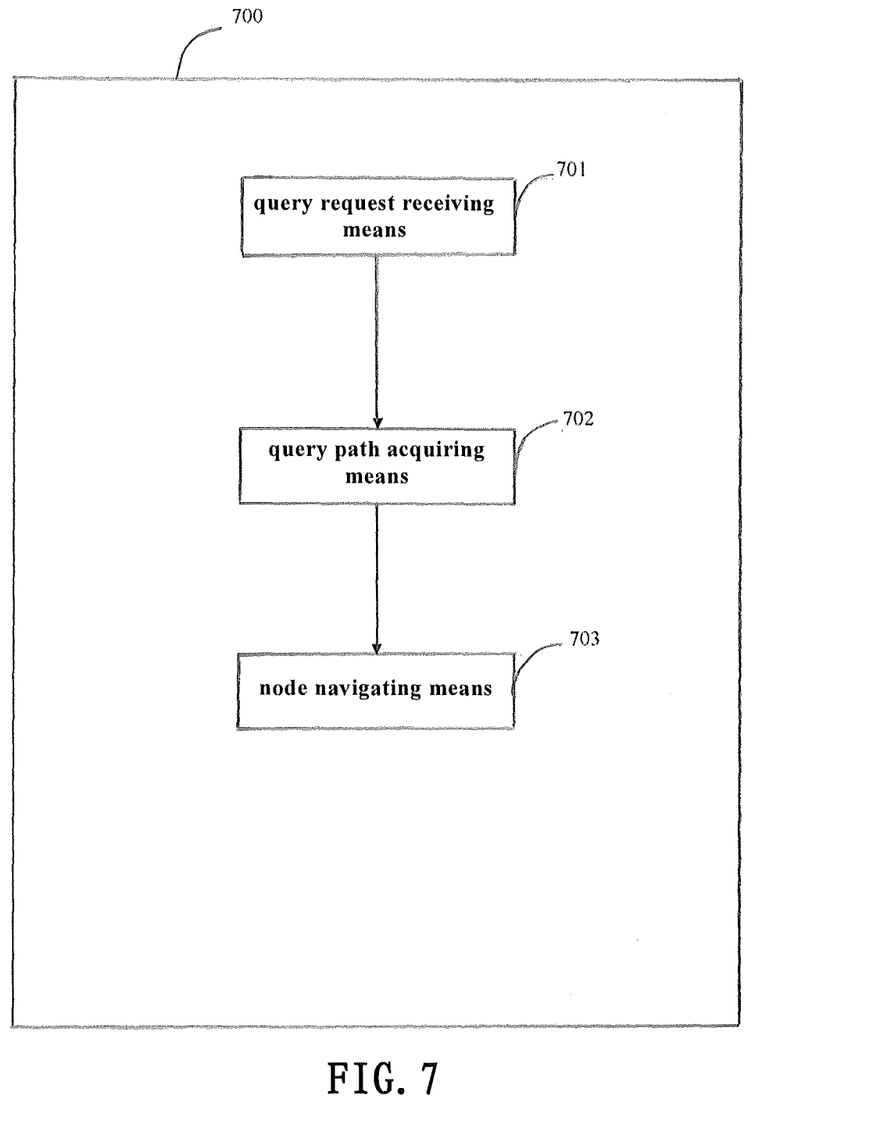
FIG. 7 is a block diagram showing a system for navigating to a node in the binary XML data according to a further embodiment of the present invention.

FIG. 7 is a block diagram showing a system for navigating to a node in binary XML data including a FCD token and a NSD token, according to an embodiment of the present invention. The system shown in FIG. 7 is represented by a system 700 as a whole. Specifically, the system 700 includes: query request receiving means 701 configured to receive a request to query a node in the binary XML data; query path acquiring means 702 configured to acquire a query path of the query request; and node navigating means 703 configured to navigate to the queried node by using the query path and the FCD token and the NSD token included in the binary XML data. It can be understood that, the means 701-703 in the system 700 correspond to blocks 301-303 of the method shown in FIG. 3, respectively.

Figure 8A:
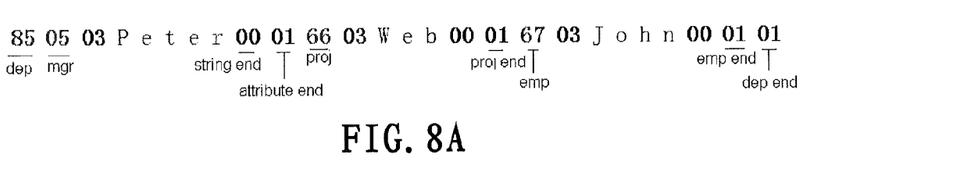
FIG. 8A is a schematic diagram showing a node query based on WBXML (wireless application protocol binary XML) data excluding the FCD and NSD tokens according to an embodiment of the present invention.
Figure 8B:
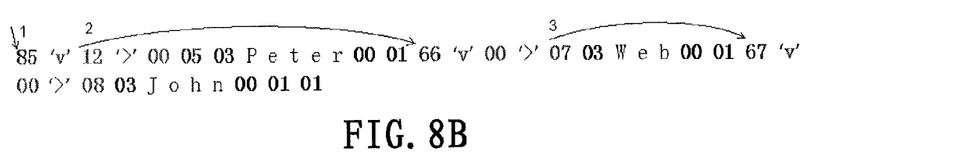
FIG. 8B is a schematic diagram showing a node query based on WBXML data including the FCD and NSD tokens according to an embodiment of the present invention.

FIGS. 8A and 8B are schematic diagrams respectively showing a node query based on WBXML data excluding and including FCD and NSD tokens. Similar to the previous example, IBM binary XML, WBXML is also a binary XML data format standard. With regard to the way of converting an XML data source into binary XML data, defined by WBXML, those of ordinary skill in the art can refer to the published specification of the WBXML standard. It should be noted here that, as shown in FIG. 8B, node skipping can be achieved in the WBXML standard-based binary XML data to which FCD and NSD tokens are added (also according to the examples of the XML data source listed above), with the only difference that values of the FCD and NSD tokens added behind each element node are different.

Figure 9A:
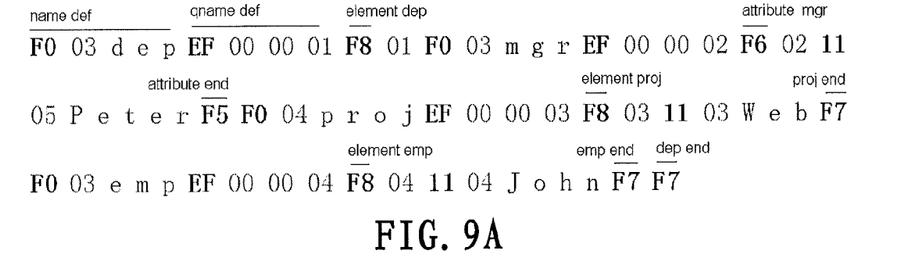
FIG. 9A is a schematic diagram showing a node query based on Microsoft® Server Binary XML (MS-BINXML) data excluding the FCD and NSD tokens according to an embodiment of the present invention.
Figure 9B:
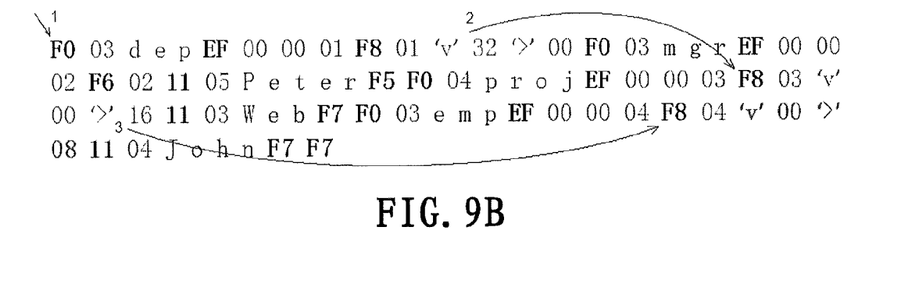
FIG. 9B is a schematic diagram showing a node query based on MS-BINXML data including the FCD and NSD tokens according to an embodiment of the present invention.

FIGS. 9A and 9B are schematic diagrams respectively showing a node query based on MS-BINXML data excluding and including FCD and NSD tokens. Similar to WBXML and IBM binary XML, MS-BINXML is also a binary XML data format standard. With regard to the way of converting an XML data source into binary XML data, defined by MS-BINXML, those of ordinary skill in the art can refer to the published specification of the MS-BINXML standard. It should be noted here that, as shown in FIG. 9B, node skipping can be achieved in the MS-BINXML standard-based binary XML data to which FCD and NSD tokens are added (also according to the examples of the XML data source listed above), with the only difference that values of the FCD and NSD tokens added behind each element node are different.

It can be seen by comparing the different binary XML data standard formats shown in FIGS. 4A and 4B, FIGS. 8A and 8B, and FIGS. 9A and 9B that, no matter what specific binary XML data format specifications are, they all process the element nodes in the XML data source sequentially in order according to the sequentially arranged XML data source with a tree structure, thereby converting the XML data source into corresponding binary XML data. Although the resulting binary XML data obtained according to each binary XML standard has a different form, the FCD token and the NSD token can be added to the binary XML data while generating the binary XML data by using their common feature of "structured data", and node skipping can be performed when querying the improved binary XML data by using the FCD and NSD tokens added, thereby improving the efficiency of node navigation and query.

It should be emphasized that, in the above various standard binary XML examples and binary XML examples including the FCD and NSD tokens shown in the description and accompanying drawings, for the convenience of understanding, relevant values are represented directly in a form of decimal digits. However, in fact, the above examples do not necessarily represent original formats of storage of the binary XML data in the computer.

As will be appreciated by one skilled in the art, the above system, apparatus and method can be implemented by using computer executable instructions and/or control codes included in a processor, for example, such codes are provided on a carrier medium such as disk, CD or DVD-ROM, a programmable memory such as read-only memory (firmware), or a data carrier such as optical or electronic signal carrier. The apparatus, server, and units thereof according to the embodiments may be implemented by hardware circuits such as a large scale integrated circuit or gate array, a semiconductor such as logic chip and transistor, or a programmable hardware device such as field programmable gate array and programmable logic device, or may be implemented by various kinds of software executed by the processor, or may be implemented by a combination of the hardware circuit and software.

In an embodiment, unnecessary nodes can be skipped over in the process of navigating to the binary XML data, thereby saving time for navigating to node, avoiding scanning or reading the unnecessary nodes, and improving the efficiency of querying node and navigating to node.

Although the system and method of the present invention for processing the local file by using the remote application have been described in details as above in combination of exemplary embodiments, the invention is not limited to the embodiments. Those skilled in the art could make various variations, replacements and modifications under the teaching of the specification without departing from the scope and spirit of the invention. It should be appreciated that, all these variations, replacements and modifications still fall into the protection scopes of the present invention. The protection scopes of the present invention are only defined by the attached claims.

What is claimed is:

1. A method for generating binary Extensible Markup Language (XML) data, comprising:
   acquiring a XML data source;
   generating a first child distance (FCD) token and a next sibling distance (NSD) token of an element node in the XML data source, wherein the FCD token of the element node represents a distance from an end point of the FCD token to a start point of a first child node of the element node and wherein based on determining that the element node has no sibling node, the NSD token of the element node represents a distance from the end point of the NSD token to an end point of the parent node of the element node; and
   generating binary XML data of the XML data source by using the FCD token and the NSD token, wherein the binary XML data includes the FCD token and the NSD token.

2. The method according to claim 1, wherein, if the element node is a leaf node, the FCD token is zero, and the NSD token of the element node represents a distance from the end point of the NSD token to a start point of a next sibling node of the element node.

3. The method according to claim 2, wherein based on determining that the element node has neither a sibling node nor a parent node, the NSD token of the element node is zero.

4. The method according to claim 1, wherein generating the FCD token and the NSD token of the element node comprises:
   initializing the FCD token and the NSD token to be zero;
   for a non-leaf node, calculating the FCD and updating the FCD token when starting to process its first child node; and
   for a non-root node, calculating the NSD and updating the NSD token when starting to process its next sibling node.

5. A method for navigating binary Extensible Markup Language (XML) data including a first child distance (FCD) token and a next sibling distance (NSD) token, the method comprising:
   receiving a request to query a node in the binary XML data, wherein the FCD token of an element node represents a distance from an end point of the FCD token to a start point of a first child node of the element node and wherein based on determining that the element node has no sibling node, the NSD token of the element node represents a distance from the end point of the NSD token to an end point of the parent node of the element node;
   acquiring a query path of the request; and
   navigating to the node by using the query path, the FCD token and the NSD token.

6. The method according to claim 5, wherein navigating to the node by using the query path, the FCD token and the NSD token comprises:
   skipping to a first child node of an element node in the binary XML data by using the FCD token of the element node; and
   skipping to a next sibling node of the element node in the binary XML data by using the NSD token of the element node.

7. The method according to claim 5, wherein navigating to the node by using the query path, the FCD token and the NSD token comprises:
   navigating to a first element node in the binary XML data;
   judging whether the name of the first element node is consistent with that of a first element node in the query path;
   skipping to a first child node of the first element node by using the FCD token of the first element node in a binary document responsive the name of the first node being consistent with that of the first element node in the query path judging whether a name of the first child node is consistent with that of the second node in the query path; and
   skipping to a next sibling node of the first child node by using the NSD token of the first child node responsive to the name of the first child node not being consistent with that of the first element node in the query path.

8. The method according to claim 7, further comprising:
   further judging whether nodes in the query path have been traversed and determining that the navigation operation for the node to be queried has been completed responsive to the name of the first child node being consistent with that of the second node in the query path; and
   repeating, for the first child node, the skipping to the first child node, the judging whether the name of the first child node is consistent with that of the second node in the query path, and the skipping to the next sibling node, the repeating responsive to the name of the first child node not being consistent with that of the second node in the query path.

9. The method according to claim 8, further comprising:
judging whether a name of the next sibling node is consistent with that of the second node in the query path;
repeating, for the next sibling node, the skipping to a next sibling node and the judging whether the name of the next sibling node is consistent with that of the second node in the query path, responsive to the name of the next sibling node not being consistent with that of the second node in the query path; and
further judging whether the nodes in the query path have been traversed and determining that the navigation operation for the node to be queried has been completed responsive to the name of the next sibling node being consistent with that of the second node in the query path; and repeating, for the next sibling node, the skipping to the first child node of the first element node by using the FCD token of the first element node in the binary document responsive to the name of the first node being consistent with that of the first element node in the query path, the judging whether the name of the first child node is consistent with that of the second node in the query path, the skipping to the next sibling node of the first child node by using the NSD token of the first child node responsive the name of the first node not being consistent with that of the first element node in the query path, the judging whether the name of the next sibling node is consistent with that of the second node in the query path, repeating the skipping to a next sibling node and the judging whether the name of the next sibling node for the next sibling node responsive to the name of the next sibling node not being consistent with that of the second node in the query path, and determining that the navigation operation for the node to be queried has been completed responsive to the name of the next sibling node being consistent with that of the second node in the query path.

10. The method according to claim 5, wherein the FCD token of the node represents a distance from an end point of the FCD token to a start point of a first child node of the node, wherein, based on determining that the node is a leaf node, the FCD token is zero, and the NSD token of the node represents a distance from the end point of the NSD token to a start point of a next sibling node of the node.

11. A system for generating binary Extensible Markup Language (XML) data, the system comprising:
a processor configured to:
acquire a XML data source;
generate a first child distance (FCD) token and a next sibling distance (NSD) token of an element node in the XML data source, wherein the FCD token of the element node represents a distance from an end point of the FCD token to a start point of a first child node of the element node and wherein based on determining that the element has no sibling node, the NSD token of the element node represents a distance from the end point of the NSD token to an end point of the parent node of the element node; and
generate binary XML data of the XML data source by using the FCD token and the NSD token, wherein the binary XML data includes the FCD token and the NSD token.

12. The system according to claim 11, wherein based on determining that the element node is a leaf node, the FCD token is zero, and the NSD token of the element node represents a distance from the end point of the NSD token to a start point of a next sibling node of the element node.

13. The system according to claim 12, wherein based on determining that the element has neither a sibling node nor a parent node, the NSD token of the element node is zero.

14. The system according to claim 11, wherein generating the First Child Distance (FCD) token and the Next Sibling Distance (NSD) token of the element node comprises:
initializing the FCD token and the NSD token to be zero;
for a non-leaf node, calculating the FCD and update the FCD token when starting to process its first child node; and
for a non-root node, calculating the NSD and update the NSD token when starting to process its next sibling node.

15. A system for navigating to a nod binary XML data including a First Child Distance (FCD) token and a Next Sibling Distance (NSD) token, the system comprising:
a processor configured to:
receive a request to query a node in the binary XML data, wherein the FCD token of an element node represents a distance from an end point of the FCD token to a start point of a first child node of the element node and wherein based on determining that the element node has no sibling node, the NSD token of the element node represents a distance from the end point of the NSD token to an end point of the parent node of the element node;
acquire a query path of the request; and
navigate to the node by using the query path and the FCD token and the NSD token.

16. The system according to claim 15, wherein navigating to the node comprises:
skipping to a first child node of an element node in the binary XML data by using the FCD token of the element node; and
skipping to a next sibling node of the element node in the binary XML data by using the NSD token of the element node.

17. The system according to claim 15, wherein navigating to the node comprises:
navigating to a first element node in the binary XML data;
judging whether the name of the first element node is consistent with that of a first element node in the query path;
skipping to a first child node of the first element node by using the FCD token of the first element node in a binary document responsive the name of the first node being consistent with that of the first element node in the query path;
judging whether a name of the first child node is consistent with that of the second node in the query path; and
skipping to a next sibling node of the first child node by using the NSD token of the first child node responsive to the name of the first child node not being consistent with that of the first element node in the query path.

18. The system according to claim 17, wherein navigating to the node comprises:
further judging whether nodes in the query path have been traversed and determining that the navigation operation for the node to be queried has been completed responsive to the name of the first child node being consistent with that of the second node in the query path; and repeating, for the first child node, the skipping to the first child node, the judging whether the name of the first child node and the skipping to the next sibling node responsive to the name of the first child node not being consistent with that of the second node in the query path.

19. The system according to claim 17, wherein navigating to the node comprises:
- judging whether a name of the next sibling node is consistent with that of the second node in the query path;
- repeating, for the next sibling node, the skipping to a next sibling node and the judging whether the name of the next sibling node responsive to the name of the next sibling node not being consistent with that of the second node in the query path; and
- further judging whether the nodes in the query path have been traversed and determining that the navigation operation for the node to be queried has been completed responsive to the name of the next sibling node being consistent with that of the second node in the query path; and repeating, for the next sibling node, the skipping to the first child node of the first element node by using the FCD token of the first element node in the binary document responsive the name of the first node being consistent with that of the first element node in the query path, the judging whether the name of the first child node is consistent with that of the second node in the query path, the skipping to the next sibling node of the first child node by using the NSD token of the first child node responsive the name of the first node not being consistent with that of the first element node in the query path, the judging whether the name of the next sibling node is consistent with that of the second node in the query path, repeating the skipping to a next sibling node and the judging whether the name of the next sibling node for the next sibling node responsive to the name of the next sibling node not being consistent with that of the second node in the query path, and determining that the navigation operation for the node to be queried has been completed responsive to the name of the next sibling node being consistent with that of the second node in the query path.

20. The system according to claim 15, wherein the FCD token of the node represents a distance from an end point of the FCD token to a start point of a first child node of the node, wherein based on determining that the node is a leaf node, the FCD token is zero, and the NSD token of the node represents a distance from the end point of the NSD token to a start point of a next sibling node of the node.

* * * * *